United States Patent
Kitayama et al.

(10) Patent No.: US 7,204,936 B2
(45) Date of Patent: Apr. 17, 2007

(54) POLISHING COMPOSITION (75) Inventors: Hiroaki Kitayama, Wakayama (JP); Shigeo Fujii, Wakayama (JP); Toshiya Hagihara, Wakayama (JP)

(73) Assignee: Kao Corporation, Tokyo (JP)

( * ) Notice: Subject to any disclaimer, the term of this patent is extended or adjusted under 35 U.S.C. 154(b) by 130 days.

(21) Appl. No.: 10/625,610

(22) Filed: Jul. 24, 2003

(65) Prior Publication Data

US 2004/0132385 A1   Jul. 8, 2004

(30) Foreign Application Priority Data

Jul. 31, 2002  (JP)  .............................. 2002-223713
Aug. 8, 2002   (JP)  .............................. 2002-231362

(51) Int. Cl.
*C09K 13/00*  (2006.01)
*C09K 13/06*  (2006.01)
*H01L 21/302* (2006.01)

(52) U.S. Cl. .................. 252/79.1; 252/79.2; 252/79.4; 438/692

(58) Field of Classification Search ............... 252/79.1, 252/79.4, 79.2; 438/692
See application file for complete search history.

(56) References Cited

U.S. PATENT DOCUMENTS

| | | | |
|---|---|---|---|
| 6,033,596 A | | 3/2000 | Kaufman et al. |
| 6,379,406 B1 * | | 4/2002 | Thomas et al. ................. 51/309 |
| 6,436,811 B1 * | | 8/2002 | Wake et al. .................. 438/633 |
| 2001/0051746 A1 | | 12/2001 | Hagihara et al. |
| 2002/0028580 A1 * | | 3/2002 | Nojo et al. ................... 438/689 |
| 2003/0064596 A1 * | | 4/2003 | Lee et al. .................... 438/689 |

FOREIGN PATENT DOCUMENTS

| | | |
|---|---|---|
| CN | 1281023 A | 1/2001 |
| EP | 1116762 A1 | 7/2001 |
| GB | 2350369 A | 11/2000 |
| GB | 2354525 A | 3/2001 |
| GB | 2354769 A | 4/2001 |
| GB | 2371555 A | 7/2002 |
| JP | 9-256171 A | 9/1997 |
| JP | 11-21545 A | 1/1999 |

(Continued)

*Primary Examiner*—Nadine Norton
*Assistant Examiner*—Lynette T. Umez-Eronini
(74) *Attorney, Agent, or Firm*—Birch, Stewart, Kolasch & Birch, LLP (57) ABSTRACT

A polishing composition comprising 0.03 to 0.5% by weight of an organic acid or a salt thereof, an abrasive and water, wherein the abrasive has a surface potential of from −140 to 200 mV; a roll-off reducing agent comprising an inorganic compound having a property of controlling a surface potential of an abrasive in a polishing composition, wherein a surface potential of the abrasive in a standard polishing composition is controlled to −110 to 250 mV by the presence of the inorganic compound, wherein the standard polishing composition is prepared which comprises 20 parts by weight of an abrasive, the abrasive being high-purity alumina having $Al_2O_3$ purity of 98.0% by weight or more composed of α-type corundum crystal, 1 part by weight of citric acid, 78 parts by weight of water and 1 part by weight of an inorganic compound. The polishing composition or the roll-off reducing agent composition can be favorably used in polishing the substrate for precision parts.

5 Claims, 1 Drawing Sheet

FOREIGN PATENT DOCUMENTS

| | | |
|---|---|---|
| JP | 11-33896 A | 2/1999 |
| JP | 11-283943 A | 10/1999 |
| JP | 2001-155332 A | 6/2001 |
| JP | 2002-12857 A | 1/2002 |
| JP | 2002-20732 A | 1/2002 |
| JP | 2002-167575 A | 6/2002 |
| JP | 2003-510446 A | 3/2003 |
| JP | 2003-151928 A | 5/2003 |

* cited by examiner

FIG. 1

POLISHING COMPOSITION

BACKGROUND OF THE INVENTION

1. Field of the Invention

The present invention relates to a roll-off reducing agent in the polishing step and a polishing composition using the roll-off reducing agent. Furthermore, the present invention relates to a process for producing a substrate comprising applying the polishing composition to the substrate, and a process for reducing roll-off in the polishing step comprising applying the polishing composition to a substrate.

2. Discussion of the Related Art

Over the years, a demand for a technique for further increasing the capacity of the hard discs has become greater. As a leading means for increasing the capacity of the hard discs, there has been considered a means of producing a substrate capable of recording data even to its outer periphery by reducing roll-off (edge rounding of end side of a substrate) caused in the polishing process. For instance, various mechanical polishing conditions, such as making a polishing pad more rigid, and making a polishing load smaller, have been studied in order to produce a substrate having a reduced roll-off. However, although a certain extent of an effect is obtained by reducing roll-off with these mechanical polishing conditions, the effect has not yet been satisfactory. Also, from the viewpoint of reducing roll-off from the polishing composition used in the polishing step, the use of a specified organic acid represented by an organic acid having hydroxyl group (Japanese Patent Laid-Open No. 2002-12857), the use of sol product of aluminum salt (Japanese Patent Laid-Open No. 2002-20732) and the like have been proposed. However, roll-off cannot be said to be satisfactorily reduced.

As mentioned above, the reason why the roll-off is generated in the end side portion of the substrate at which the surface is more polished than that the internal of the substrate is presumably due to the fact that the pressure during polishing of the substrate is higher at the end side portion than that of the internal of the substrate. Therefore, the present inventors have remarked on a compound capable of controlling aggregation of abrasive grains of the abrasive from a new viewpoint not found conventionally in which the difference in pressure is caused by polishing the end side portion undesirably greatly when the abrasive comes between the substrate and the polishing device such as a polishing pad, due to the fact that an aggregation force of the abrasive grains of the abrasive is large. The present invention has been perfected thereby.

SUMMARY OF THE INVENTION

According to the present invention, there are provided:
[1] a polishing composition comprising 0.03 to 0.5% by weight of an organic acid or a salt thereof, an abrasive and water, wherein the abrasive has a surface potential of from −140 to 200 mV;
[2] a roll-off reducing agent comprising an inorganic compound having a property of controlling a surface potential of an abrasive in a polishing composition, wherein a surface potential of the abrasive in a standard polishing composition is controlled to −110 to 250 mV by the presence of the inorganic compound, wherein the standard polishing composition is prepared which comprises 20 parts by weight of an abrasive, the abrasive being high-purity alumina having $Al_2O_3$ purity of 98.0% by weight or more composed of α-type corundum crystal, 1 part by weight of citric acid, 78 parts by weight of water and 1 part by weight of an inorganic compound;
[3] a polishing composition comprising the roll-off reducing agent as defined in [2] above;
[4] a process for producing a substrate comprising a step of polishing a substrate to be polished with the polishing composition of [1] or [3] above;
[5] a process of reducing roll-off of a substrate, comprising applying to a substrate to be polished a polishing liquid comprising the roll-off reducing agent as defined in [2] above in the polishing step; and
[6] a process of reducing roll-off of a substrate, comprising applying to a substrate to be polished the polishing composition as defined in [1] or [3] above in the polishing step.

DETAILED DESCRIPTION OF THE INVENTION

The present invention relates to a roll-off reducing agent having sufficient polishing rate and being capable of reducing the roll-off of the substrate to be polished caused by polishing; a polishing composition comprising the roll-off reducing agent; a process for producing a substrate comprising applying the polishing composition to the substrate; and a process of reducing roll-off of a substrate, comprising applying to a substrate to be polished a polishing liquid comprising the roll-off reducing agent or the polishing composition.

These and other advantages of the present invention will be apparent from the following description.

1. Polishing Composition of Embodiment a

As mentioned above, one of the greatest features of the polishing composition of the present invention (which may be hereinafter also referred to as "polishing composition of the embodiment a") resides in that the polishing composition comprises 0.03 to 0.5% by weight of an organic acid or a salt thereof, an abrasive and water, wherein the abrasive has a surface potential of from −140 to 200 mV. Since the polishing composition has the above characteristics, there are exhibited remarkable effects that the roll-off of the substrate to be polished can be significantly reduced, so that a substrate capable of recording to its outer peripheral portion can be produced.

Although the function mechanisms for reducing the roll-off of the substrate to be polished by adjusting the surface potential of the abrasive in the polishing composition of the embodiment a are not elucidated into details, they may be presumably as follows. Specifically, since the organic acid or a salt is formulated in the polishing composition in the amount specified above, the aggregation force of the abrasives themselves is controlled. As a result, there is a relationship of [pressure at end surface>aggregation force of abrasive grains] at the end surface to which a high pressure is exerted during polishing, caused by the deformation of the pad, so that the aggregation of the abrasive grains is disintegrated and that the polishing rate is lowered. Conversely, there is a relationship of [internal pressure<aggregation force] in the internal of the substrate at which a lower pressure is exerted as compared to that of the end side, so that the re-aggregation of the abrasive grains is generated, and that the polishing rate is maintained. Therefore, the difference in the polishing rates at the internal and the outer peripheral portion (end surface portion) becomes small, so that the roll-off is considered to be reduced.

In the present invention, the surface potential of the abrasive refers to a potential after 5 minutes measured by particle charge detecting device when the polishing composition of the embodiment a comprising the abrasive is filtered under reduced pressure with a 0.45 μm pore diameter filter, and 0.1 g of the abrasive, which is the collected filtration residue, is re-dispersed in 70 g of water (hereinafter referred to as "specified surface potential A"). Concretely, the surface potential refers to those values determined in accordance with the method described in Examples set forth below.

The surface potential of the abrasive in the above-mentioned polishing composition of the embodiment a is not particularly limited, as long as the surface potential is from −140 to 200 mV, and the surface potential is preferably from −120 to 150 mV, more preferably from −120 to 120 mV, still more preferably from −110 to 110 mV, especially preferably from −105 to 105 mV.

As the abrasive used in the present invention, any abrasives generally employed for polishing can be used. The abrasive includes, for instance, metals; carbides of metals or metalloids, nitrides of metals or metalloids, oxides of metals or metalloids, borides of metals or metalloids, diamond, and the like. The metals or metalloids include those elements belonging to the Group 2A, 2B, 3A, 3B, 4A, 4B, 5A, 6A, 7A or 8 of the Periodic Table (long period form). Concrete examples of the abrasive include α-alumina particles, intermediate alumina particles, alumina sol, silicon carbide particles, diamond particles, magnesium oxide particles, zinc oxide particles, cerium oxide particles, zirconium oxide particles, colloidal silica particles, fumed silica particles, and the like. Among them, alumina such as α-alumina particles, intermediate alumina particles and alumina sol are preferable, from the viewpoint of the balance between the polishing rate and the economic advantages. It is preferable to use one or more kinds of these abrasives, from the viewpoint of increasing the polishing rate. Also, these abrasives may be used in admixture of two or more kinds depending upon the necessity of the polishing property. As to the abrasives depending upon their applications, alumina particles such as α-alumina particles, intermediate alumina particles and alumina sol are preferred for rough polishing of an Ni—P plated aluminum alloy substrate, and further a combination of α-alumina particles, and intermediate alumina particles (especially θ-alumina particles) is especially preferable, from the viewpoints of increase of polishing rate, prevention of surface defects and reduction of the surface roughness. In addition, silica particles such as colloidal silica particles and fumed silica particles are preferred for finish polishing of an Ni—P plated aluminum alloy substrate. Cerium oxide particles and alumina particles are preferred for polishing glassy materials. Cerium oxide particles, alumina particles and silica particles are preferred for polishing semiconductor wafer, semiconductor element and the like.

The average primary particle size of the abrasive is preferably from 0.01 to 3 μm, more preferably from 0.01 to 0.8 μm, especially preferably from 0.02 to 0.5 μm, from the viewpoint of increasing the polishing rate. Further, when the primary particles are aggregated to form a secondary particle, the average secondary particle size is preferably from 0.02 to 3 μm, more preferably from 0.05 to 1.5 μm, especially preferably from 0.1 to 1.2 μm, from the viewpoint of increasing the polishing rate in the same manner as above, and from the viewpoint of reducing the surface roughness of a polished object. The average primary particle size of the abrasive is obtained by subjecting the abrasive to an image analysis by observing with a scanning electron microscope (favorably from 3000 to 30000 times) or a transmission electron microscope (favorably from 10000 to 300000 times), and determining the particle size as a number-average particle size. In addition, the average secondary particle size can be determined as volume-average particle size by using a laser diffraction method.

The specific gravity of the abrasive is preferably from 2 to 6, more preferably from 2 to 5, from the viewpoints of the dispersibility, the feed ability to the polishing device and recovery and reuse.

The total content of the abrasive is preferably from 1 to 40% by weight, more preferably from 2 to 30% by weight, still more preferably from 3 to 25% by weight, of the polishing composition of the embodiment a, from the viewpoints of having economic advantages and making the surface roughness of a polished object small, thereby efficiently polishing the substrate.

In addition, the polishing composition of the embodiment a of the present invention comprises 0.03 to 0.5% by weight of an organic acid or a salt thereof. In the present invention, since the polishing composition comprises the organic acid or a salt thereof, there is an advantage that the surface potential of the above-mentioned abrasive can be controlled to a specified value. The organic acid used in the present invention refers to a molecule containing at least one carbon atom, and a group which can be a Brönsted acid such as a carboxylic acid or sulfonic acid. The organic acid or a salt thereof is not particularly limited, as long as the specified surface potential A of the abrasive can be controlled to −140 to 200 mV, and the organic acid or a salt thereof is preferably a carboxylic acid or a salt thereof. The carboxylic acid and a salt thereof includes monocarboxylic or polycarboxylic acids, aminocarboxylic acids, amino acids and salts thereof, and the like. These compounds can be roughly divided into the compounds (A) and the compounds (B) from their properties.

Although the compound belonging to the compounds (A) alone can increase the polishing rate, the compound also has a remarkable characteristic of having an action of reducing roll-off by adding the compound (A) to the polishing composition comprising another organic acid or a salt thereof represented by the compounds (B), as compared to those without adding the compounds (A). The compound for the compounds (A) is at least one compound selected from the group consisting of a monocarboxylic acid or polycarboxylic acid having either OH group or groups or SH group or groups, a dicarboxylic acid having 2 to 3 carbon atoms and having neither OH group or groups nor SH group or groups, a monocarboxylic acid having neither OH group or groups nor SH group or groups and a salt thereof. It is desired that the number of carbon atoms of the monocarboxylic or polycarboxylic acid having either OH group or groups or SH group or groups is from 2 to 20, preferably from 2 to 10, more preferably from 2 to 8, still more preferably from 2 to 6, from the viewpoint of the solubility to water. Also, an α-hydroxycarboxyl compound is preferred from the viewpoint of reducing the roll-off. The number of carbon atoms of the monocarboxylic acid having neither OH group or groups nor SH group or groups is preferably from 1 to 20, more preferably from 1 to 10, still more preferably from 1 to 8, especially preferably from 1 to 5, from the viewpoint of the solubility to water. The dicarboxylic acid having 2 to 3 carbon atoms means specifically oxalic acid and malonic acid.

Examples of the monocarboxylic or polycarboxylic acid having 2 to 20 carbon atoms and having either OH group or groups or SH group or groups, the dicarboxylic acid having 2 to 3 carbon atoms and having neither OH group or groups nor SH group or groups, and the monocarboxylic acid having 1 to 20 carbon atoms and having neither OH group or groups nor SH group or groups include those described in page 2, right column, line 44 to page 3, left column, line 45 of Japanese Patent Laid-Open No. 2002-12857, the entire contents of which are incorporated herein by reference, and the like.

Concrete examples of the monocarboxylic or polycarboxylic acid having 2 to 20 carbon atoms and having either OH group or groups or SH group or groups of the compounds (A) include glycolic acid, mercaptosuccinic acid, thioglycolic acid, lactic acid, β-hydroxypropionic acid, malic acid, tartaric acid, citric acid, isocitric acid, allocitric acid, gluconic acid, glyoxylic acid, glyceric acid, mandelic acid, tropic acid, benzilic acid, salicylic acid, and the like. Concrete examples of the monocarboxylic acid having neither OH group or groups nor SH group or groups include formic acid, acetic acid, propionic acid, butyric acid, isobutyric acid, valeric acid, isovaleric acid, hexanoic acid, heptanoic acid, 2-methylhexanoic acid, octanoic acid, 2-ethylhexanoic acid, nonanoic acid, decanoic acid, lauric acid, and the like. Among these compounds (A), acetic acid, oxalic acid, malonic acid, glycolic acid, lactic acid, malic acid, tartaric acid, glyoxylic acid, citric acid and gluconic acid are preferable; oxalic acid, malonic acid, glycolic acid, lactic acid, malic acid, tartaric acid, glyoxylic acid, citric acid and gluconic acid are more preferable; malic acid, tartaric acid and citric acid are especially preferable; and citric acid is most preferable.

The salts of these compounds (A) are not particularly limited. Concrete examples include salts with a metal, ammonium, an alkylammonium, an organic amine, and the like. Concrete examples of the metal include metals belonging to Group 1A, 1B, 2A, 2B, 3A, 3B, 4A, 6A, 7A or 8 of the Periodic Table (long period form). Among these metals, from the viewpoint of reducing clogging, those metals belonging to Group 1A, 3A, 3B, 7A or 8 of the Periodic Table are preferable, and those metals belonging to Group 1A, 3A or 3B of the Periodic Table are more preferable. Sodium and potassium belonging to Group 1A are most preferable.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these salts, ammonium salts, sodium salts and potassium salts are especially preferable.

The compounds (A) can be used alone or in admixture of two or more kinds.

The compounds (B) used in the present invention are compounds especially having excellent action for increasing polishing rates. The compounds (B) include a polycarboxylic acid having 4 or more carbon atoms and having neither OH group or groups nor SH group or groups, an aminocarboxylic acid, an amino acid, a salt thereof and the like.

From the viewpoint of increasing the polishing rate, among the polycarboxylic acids having 4 or more carbon atoms and having neither OH group or groups nor SH group or groups, those having 4 to 20 carbon atoms are preferable, and those having 4 to 10 carbon atoms are more preferable in consideration of the additional viewpoint of the improvement in water solubility are preferable. Also, it is desired that the number of carboxyl groups of the polycarboxylic acid is from 2 to 10, preferably from 2 to 6, especially preferably from 2 to 4. In addition, as the aminocarboxylic acid, the number of amino groups in one molecule is preferably from 1 to 6, more preferably from 1 to 4, from the viewpoint of improvement in water solubility. The number of carboxylate groups of the aminocarboxylic acid is preferably from 1 to 12, more preferably from 2 to 8, and the number of carbon atoms is preferably from 1 to 30, more preferably 1 to 20. From the same viewpoint, the number of carbon atoms of the amino acid is preferably from 2 to 20, more preferably from 2 to 10.

Examples of the compounds (B) include those described in page 4, left column, lines 13 to 30 of Japanese Patent Laid-Open No. 2002-30276, the entire contents of which are incorporated herein by reference, and the like.

Concrete examples of the compounds (B) include succinic acid, maleic acid, fumaric acid, glutaric acid, citraconic acid, itaconic acid, tricarballylic acid, adipic acid, propane-1,1,2,3-tetracarboxylic acid, butane-1,2,3,4-tetracarboxylic acid, diglycolic acid, nitrilotriacetic acid, ethylenediaminetetraacetic acid (EDTA), diethylenetriaminepentaacetic acid (DTPA), hydroxyethylethylenediaminetetraacetic acid (HEDTA), triethylenetetraminehexaacetic acid (TTHA), dicarboxymethylglutamic acid (GLDA), glycine, alanine, and the like.

Among them, succinic acid, maleic acid, fumaric acid, glutaric acid, citraconic acid, itaconic acid, tricarballylic acid, adipic acid, diglycolic acid, nitrilotriacetic acid, ethylenediaminetetraacetic acid and diethylenetriaminepentaacetic acid are preferable, and succinic acid, maleic acid, fumaric acid, citraconic acid, itaconic acid, tricarballylic acid, diglycolic acid, ethylenediaminetetraacetic acid and diethylenetriaminepentaacetic acid are more preferable.

The salts of these compounds (B) include the same ones as those for the above-mentioned compounds (A).

The compounds (B) can be used alone or in admixture of two or more kinds. Furthermore, it is especially preferable that the compounds (A) and the compounds (B) are used in combination from the viewpoint of the balance in the polishing properties.

The organic acid or a salt thereof used in the present invention is preferably the compounds (A) or a salt thereof from the viewpoint of reducing the roll-off, and a polycarboxylic acid having 2 to 10 carbon atoms and having either OH group or groups or SH group or groups or a salt thereof is more preferable from the viewpoint of the polishing rate. Among them, hydroxycarboxylic acids such as citric acid, malic acid and tartaric acid and salts thereof are most preferable.

The content of the organic acid or a salt thereof in the polishing composition of the embodiment a of the present invention is from 0.03 to 0.5% by weight, preferably from 0.04 to 0.5% by weight, more preferably from 0.05 to 0.5% by weight, most preferably from 0.05 to 0.4% by weight, of the polishing composition of the embodiment a, from the viewpoint of reducing the absolute value of the specified surface potential A of the abrasive, thereby improving the roll-off. The organic acid or a salt thereof can be used alone or in admixture of two or more kinds.

Water in the polishing composition of the embodiment a of the present invention is used as a medium, and the content of water is preferably from 55 to 98.98% by weight, more preferably from 60 to 97.5% by weight, still more preferably from 70 to 96.8% by weight, from the viewpoint of efficiently polishing the object to be polished.

The other components include, for instance, inorganic acids and salts thereof, oxidizing agents, anticorrosive agents, basic substances, and the like. Concrete examples of the inorganic acids and salts thereof, and the oxidizing agents include those listed in Japanese Patent Laid-Open No. Sho 63-251163, page 2, lower left column, lines 7 to 14; Japanese Patent Laid-Open No. Hei 1-205973, page 3, upper left column, line 11 to upper right column, line 2; Japanese Patent Laid-Open No. Hei 3-115383, page 2, lower right column, line 16 to page 3, upper left column, line 11; Japanese Patent Laid-Open No. Hei 4-275387, page 2, right column, line 27 to page 3, left column, line 12, the entire contents of which are incorporated herein by reference, and the like. These other components can be used alone or in admixture of two or more kinds. The content of the other components is preferably from 0.05 to 20% by weight, more preferably from 0.05 to 10% by weight, still more preferably from 0.05 to 5% by weight, of the polishing composition of the embodiment a, from the viewpoint of exhibiting the respective functions and from the viewpoint of economic advantages.

In addition, the polishing composition of the present invention can optionally comprise other components such as a disinfectant and an antibacterial agent. The content of these disinfectant and antibacterial agent is preferably from 0.0001 to 0.1% by weight, more preferably from 0.001 to 0.05% by weight, still more preferably from 0.002 to 0.02% by weight, of the polishing composition of the embodiment a, from the viewpoint of exhibiting the respective functions, and from the viewpoints of influences to the polishing performances and economic advantages.

The concentration of each component of the polishing composition of the embodiment a is a preferable concentration during polishing, and it may be a concentration during the preparation of the composition. The polishing composition of the embodiment a is usually prepared as a concentrate, and the concentrate is diluted upon use in many cases.

The polishing composition of the embodiment a can be prepared by adding the desired additives by an arbitrary method, and mixing the components.

It is preferable that the pH of the polishing composition of the embodiment a is appropriately adjusted depending upon the kinds and the required qualities and the like of the substrate to be polished. For instance, the pH of the polishing composition of the embodiment a is preferably from 2 to 12, from the viewpoints of the cleanability of the substrate to be polished and the anti-corrosiveness of the working machine, and from the viewpoint of the safety of the operator. In addition, in a case where a substrate to be polished is a substrate for precision parts which is mainly made of a metal such as an Ni—P plated aluminum alloy substrate, the pH is preferably from 2 to 10, more preferably from 2 to 9, still more preferably from 2 to 7, especially preferably from 2 to 5, from the viewpoints of increasing the polishing rate, improving the surface qualities, and preventing clogging of the polishing pad. When the polishing composition is used for polishing a semiconductor wafer, a semiconductor element, or the like, especially for polishing a silicon substrate, a poly-silicon film, an $SiO_2$ film, or the like, the pH is preferably from 7 to 12, more preferably from 8 to 11, especially preferably from 9 to 11, from the viewpoints of increasing the polishing rate and improving the surface qualities. The pH can be adjusted by adding properly an inorganic acid such as nitric acid or sulfuric acid, an organic acid such as a hydroxycarboxylic acid, a poly- carboxylic acid, an aminopolycarboxylic acid, or an amino acid, a metal salt or an ammonium salt thereof, or a basic substance such as aqueous ammonia, sodium hydroxide, potassium hydroxide or amine in a desired amount as occasion demands.

2. Roll-Off Reducing Agent

As mentioned above, the roll-off reducing agent of the present invention comprises an inorganic compound having a property of controlling a surface potential of an abrasive in a polishing composition, wherein a surface potential of the abrasive in a standard polishing composition (hereinafter also referred to as a "specified surface potential B") is controlled to −110 to 250 mV in the presence of the inorganic compound, when the standard polishing composition comprising 20 parts by weight of an abrasive (high-purity alumina having $Al_2O_3$ purity of 98.0% by weight, composed of α-type corundum crystal), 1 part by weight of citric acid, 78 parts by weight of water and 1 part by weight of an inorganic compound is prepared. In the present invention, since the roll-off reducing agent is formulated in the polishing composition, there are exhibited some remarkable effects that the roll-off of the substrate can be significantly reduced, so that a substrate capable of recording to an outer peripheral portion can be produced.

The roll-off reducing agent of the present invention has an action of reducing roll-off of a substrate to be polished in addition to its action of controlling a surface potential of the abrasive of the polishing composition as mentioned above. Although the details of these two function mechanisms are not elucidated, they may be presumably as follows: Specifically, since the roll-off reducing agent of the present invention is used, the surface potential of the abrasive is controlled to the above-mentioned range so that the aggregation force of the abrasives themselves are controlled to be lowered. As a result, there is a relationship of [pressure at end surface>aggregation force of abrasive grains] at the end surface to which a high pressure is exerted during polishing, so that the aggregation of the abrasive grains is disintegrated and that the polishing rate is lowered. Conversely, there is a relationship of [internal pressure<aggregation force] in the internal of the substrate at which a lower pressure is exerted as compared to that of the end side, so that the re-aggregation of the abrasive grains is generated, and that the polishing rate is maintained. Therefore, the difference in the polishing rates at the internal and the outer peripheral portion (end surface portion) becomes small, so that the roll-off can be reduced.

The roll-off reducing agent of the present invention is an inorganic compound for controlling a surface potential of an abrasive in a standard polishing composition to −110 to 250 mV. The inorganic compound includes a compound not containing any carbon atoms, a salt of a carbon-containing Brönsted acid such as carbonate and cyanate, and the like.

As the roll-off reducing agent of the present invention, those having a specified surface potential B controlled to −110 to 200 mV are preferable, more preferably controlled to −100 to 200 mV, most preferably controlled to −90 to 180 mV, from the viewpoint of reducing the roll-off.

In the present invention, the standard polishing composition comprising 1% by weight of an inorganic compound is a polishing composition comprising 20 parts by weight of an abrasive (high-purity alumina having $Al_2O_3$ purity of 98.0% by weight or more composed of α-type corundum crystal), 1 part by weight of citric acid, 78 parts by weight of water and 1 part by weight of a roll-off reducing agent.

Therefore, in the present invention, the surface potential is a surface potential of an abrasive of the polishing composition comprising citric acid.

As the high-purity alumina having $Al_2O_3$ purity of 98.0% by weight or more composed of α-type corundum crystal used as an abrasive in the standard polishing composition, the high-purity alumina containing 1.2% by weight or less of $SiO_2$, 0.2% by weight or less of $Fe_2O_3$, and 0.7% by weight or less of $Na_2O$ as other components is preferable, and the alumina having a particle size of 0.6 μm at 50% accumulative point is preferable. Concrete examples thereof include one commercially available from Fujimi Incorporated under the trade name of "WA#10000."

In addition, the specified surface potential B refers to a surface potential of an abrasive in the polishing composition, and a potential after 5 to 6 minutes measured by a particle charge detecting device, when the standard polishing composition is filtered under reduced pressure with a 0.45 μm pore diameter filter, and 0.1 g of the abrasive, which is the collected filtration residue, is re-dispersed in 70 g of water, is referred to as "specified surface potential B."

Also, the roll-off reducing agent of the present invention is not particularly limited as long as the roll-off reducing agent is an organic compound having a property of controlling a specified surface potential B of an abrasive in a standard polishing composition to −110 to 250 mV. The roll-off reducing agent which dissolve in 100 g of water in an amount of preferably 0.1 g or more, more preferably 0.5 g or more, still more preferably 1 g or more, most preferably 5 g or more, from the viewpoints of controlling the surface potential and easy handling upon use.

The above-mentioned inorganic compound is preferably an ion-dissociable compound from the viewpoint of controlling the surface potential, more preferably a Brönsted acid or a salt thereof. More preferably, those having any of dissociation steps can be used, and a Brönsted acid having a dissociation step in which pKa (25° C., aqueous solution) of −10 to 10 or a salt thereof is preferred. Most preferably, a Brönsted acid having a dissociation step in which pKa (25° C., aqueous solution) of 0 to 7 or a salt thereof is preferred.

As the roll-off reducing agent used in the present invention, those having a pH of from 1 to 13 are preferred, more preferably from 2 to 10, when the roll-off reducing agent is added in an amount of 0.1 g to 100 g of water, from the viewpoints of corrosivity of the substrate and influences to human bodies.

Concrete examples of the inorganic compound used in the roll-off reducing agent used in the present invention include a nitrogen-containing inorganic acid or a salt thereof, such as nitric acid, potassium nitrate, nickel nitrate, aluminum nitrate, nitrous acid and aluminum nitrite; a sulfur-containing inorganic acid or a salt thereof, such as sulfuric acid, ammonium sulfate, potassium sulfate, nickel sulfate, aluminum sulfate, aluminum sulfite and ammonium sulfamate; a phosphorus-containing inorganic acid or a salt thereof, such as phosphoric acid, sodium phosphate, nickel phosphate, potassium phosphite and aluminum pyrophosphate; a halogen-containing inorganic acid or a salt thereof, such as hydrochloric acid, sodium chloride, sodium perchlorate, sodium perchlorite and potassium bromide; a carbonate such as sodium carbonate and potassium hydrogencarbonate; a cyanate such as sodium cyanate and potassium cyanate; a metal atom-containing inorganic acid or a salt thereof, such as tungstic acid, ammonium molybdate and sodium titanate; and the like.

Among these inorganic compounds, when the property of reducing the roll-off is considered, a polyvalent inorganic acid or a salt thereof is preferred, and a nonmetallic inorganic acid or a salt is preferred from the viewpoint of economic advantages. Further, the inorganic compound is more preferably a sulfur-containing inorganic acid or a salt thereof, from the viewpoint of the residuality of the polishing debris or the like to the produced substrate. Most preferably, the inorganic compound includes salts of the sulfur-containing inorganic acid from the viewpoints of the corrosivity and the like. Among the above-mentioned sulfur-containing inorganic acid or a salt thereof, sulfuric acid or the sulfate is especially preferable.

When the roll-off reducing agent is a salt of an ionic inorganic compound, the cationic species is not particularly limited. Concrete examples thereof includes salts of a metal, ammonium, an alkylammonium, an organic amine or the like. Concrete examples of the metals include those metals belonging to the Group 1A, 1B, 2A, 2B, 3A, 3B, 4A, 6A, 7A or 8 of the Periodic Table (long period form). Among these metals, those metals belonging to the Group 1A, 3B or 8 of the Periodic Table are preferable from the viewpoint of reducing the roll-off, especially those metals belonging to the Group 8 of the Periodic Table are preferable.

Concrete examples of the alkylammonium include tetramethylammonium, tetraethylammonium, tetrabutylammonium, and the like.

Concrete examples of the organic amine include dimethylamine, trimethylamine, alkanolamines, and the like.

Among these cationic species, ammonium, and metals belonging to the Group 8 of the Periodic Table are especially preferable.

3. Roll-Off Reducing Agent Composition

The roll-off reducing agent of the present invention can be used by formulating the roll-off reducing agent in a polishing liquid comprising an abrasive, an organic acid or a salt thereof and water. The polishing composition thus obtained is especially referred to herein as "roll-off reducing agent composition." Specifically, the roll-off reducing agent composition of the present invention comprises at least the above-mentioned roll-off reducing agent, an abrasive, an organic acid or a salt thereof and water.

The content of the above-mentioned roll-off reducing agent for controlling the surface potential of the abrasive in the roll-off reducing agent composition is preferably 0.001% by weight or more, of the polishing composition, from the viewpoint of reducing the roll-off and from the viewpoint of polishing performance, and the content is preferably 10% by weight or less, from the viewpoints of economic advantages, and from the viewpoints of the surface quality of the object to be polished and sedimentation and deposition of polishing debris. The content of the roll-off reducing agent is more preferably from 0.005 to 8 by weight, still more preferably from 0.01 to 5 by weight, most preferably from 0.05 to 3 by weight, of the roll-off reducing agent composition. The roll-off reducing agent can be used alone or in admixture of two or more kinds.

As the abrasive used in the present invention, any abrasives generally employed for polishing can be used. Examples of the abrasive may be the same ones as those used for the polishing composition of the above-mentioned embodiment a. It is preferable to use one or more kinds of these abrasives, from the viewpoint of increasing the polishing rate. Also, these abrasives may be used in admixture of two or more kinds depending upon the necessity of the polishing property. As to the abrasives depending upon their applications, it is especially preferable to use α-alumina particles in combination with γ-alumina particles or θ-alumina particles as the intermediate alumina particles. In addition, the mixing ratio of the intermediate alumina to the α-alumina (weight ratio of intermediate alumina/α-alumina) is preferably from 0.1 to 2, more preferable from 0.5 to 1.

The total content of the abrasive is preferably from 1 to 40% by weight, more preferably from 2 to 30% by weight, still more preferably from 3 to 25% by weight, of the roll-off reducing agent composition, from the viewpoints of having economic advantages and making the surface roughness of a polished object small, thereby efficiently polishing the substrate.

The organic acid or a salt thereof used in the present invention is not particularly limited as long as the organic acid or a salt thereof increases the polishing rate. The organic acid or a salt thereof includes monocarboxylic or polycarboxylic acids, aminocarboxylic acids, amino acids and salts thereof, and the like. These compounds can be roughly divided into the compounds (A) and the compounds (B) from their properties.

Although the compound belonging to the compounds (A) alone can increase the polishing rate, the compound also has a remarkable characteristic of having an action of further reducing roll-off by using the compounds (A) in combination with another agent for increasing polishing rate, represented by the compounds (B). When the compounds (A) are combined with the roll-off reducing agent of the present invention which controls the surface potential, the roll-off can be made small. The compound for the compounds (A) may be the same ones as those used in the above-mentioned polishing composition of the embodiment a. Among the compounds (A), α-hydroxycarboxylic acid or a salt thereof is preferable from the viewpoint of the polishing rate.

The compounds (B) used in the present invention are compounds especially having excellent action for increasing polishing rates. The compound for the compounds (B) may be the same ones as those used in the above-mentioned polishing composition of the embodiment a.

The total content of the organic acid or a salt thereof is preferably from 0.01 to 10% by weight, more preferably from 0.02 to 7% by weight, still more preferably from 0.03 to 5% by weight, of the roll-off reducing agent composition, from the viewpoint of exhibiting its function, and from the viewpoints of economic advantages.

Water in the roll-off reducing agent composition of the present invention is used as a medium, and the content of water is preferably from 55 to 98.999% by weight, more preferably from 60 to 97.5% by weight, still more preferably from 70 to 96.8% by weight, from the viewpoint of efficiently polishing the object to be polished.

The roll-off reducing agent composition of the present invention may optionally comprise other components. The other components include, for instance, oxidizing agents, anticorrosive agents, basic substances, and the like. Concrete examples of the oxidizing agents may be the same as those used in the above-mentioned polishing composition of the embodiment a. These other components can be used alone or in admixture of two or more kinds. Also, the content of the other components is preferably from 0.05 to 20% by weight, more preferably from 0.05 to 10% by weight, still more preferably from 0.05 to 5% by weight, of the roll-off reducing agent composition, from the viewpoint of exhibiting the respective functions and from the viewpoints of economic advantages.

In addition, the roll-off reducing agent composition of the present invention can optionally comprise other components such as a disinfectant and an antibacterial agent. The content of these disinfectant and antibacterial agent is preferably from 0.0001 to 0.1% by weight, more preferably from 0.001 to 0.05% by weight, still more preferably from 0.002 to 0.02% by weight, of the roll-off reducing agent composition, from the viewpoint of exhibiting the respective functions, and from the viewpoints of influences to the polishing performances and economic advantages.

The concentration of each component of the above-mentioned roll-off reducing agent composition is a preferable concentration during polishing, and it may be a concentration during the preparation of the composition. The roll-off reducing agent composition is usually prepared as a concentrate, and the concentrate is diluted upon use in many cases.

The roll-off reducing agent composition can be prepared by adding the desired additives by an arbitrary method, and mixing the components.

It is preferable that the pH of the roll-off reducing agent composition is appropriately adjusted depending upon the kinds and the required qualities and the like of the substrate to be polished. For instance, the pH of the roll-off reducing agent composition is preferably from 2 to 12, from the viewpoints of the cleanability of the substrate to be polished and the anti-corrosiveness of the working machine, and from the viewpoint of the safety of the operator. In addition, in a case where a substrate to be polished is a substrate for precision parts which is mainly made of a metal such as an Ni—P plated aluminum alloy substrate, the pH is preferably from 2 to 10, more preferably from 2 to 9, still more preferably from 2 to 7, especially preferably from 2 to 5, from the viewpoints of increasing the polishing rate, improving the surface qualities and preventing clogging of the polishing pad. When the roll-off reducing agent composition is used for polishing a semiconductor wafer, a semiconductor element, or the like, especially for polishing a silicon substrate, a poly-silicon film, an $SiO_2$ film, or the like, the pH is preferably from 7 to 12, more preferably from 8 to 11, especially preferably from 9 to 11, from the viewpoints of increasing the polishing rate and improving the surface qualities. The pH can be adjusted by adding properly an inorganic acid such as nitric acid or sulfuric acid, an organic acid such as a hydroxycarboxylic acid, a polycarboxylic acid, an aminopolycarboxylic acid, or an amino acid, a metal salt or an ammonium salt thereof, or a basic substance such as aqueous ammonia, sodium hydroxide, potassium hydroxide or amine in a desired amount as occasion demands.

4. Process for Producing Substrate

The process for producing a substrate of the present invention comprises the step of polishing a substrate to be polished with the polishing composition of the embodiment a or the roll-off reducing agent composition mentioned above.

The material for an object to be polished as representatively exemplified by the substrate to be polished used in the present invention includes, for instance, metals or metalloids such as silicon, aluminum, nickel, tungsten, copper, tantalum and titanium; alloys made of these metals as main components; glassy substances such as glass, glassy carbon and amorphous carbons; ceramic materials such as alumina, silicon dioxide, silicon nitride, tantalum nitride and titanium nitride; resins such as polyimide resins; and the like. Among them, it is preferable that an object to be polished is made of a metal such as aluminum, nickel, tungsten or copper, or made of an alloy containing these metals as the main components; or an object to be polished is a semiconductor substrate made of semiconductor elements containing these metals. Especially, in a case where the polishing composition of the embodiment a or the roll-off reducing agent composition of the present invention is used when polishing an aluminum alloy substrate plated with Ni—P, it is preferable because the roll-off can be especially reduced. Therefore, the present invention relates to a process for reducing roll-off of the above-mentioned substrate.

The shape for the object to be polished is not particularly limited. For instance, those having shapes containing planar portions such as discs, plates, slabs and prisms, or shapes containing curved portions such as lenses can be subjects for polishing with the polishing composition of the embodiment a or the roll-off reducing agent composition of the present invention. Among them, those having the disc-shaped objects are especially preferable in polishing.

The polishing composition of the embodiment a or the roll-off reducing agent composition of the present invention can be favorably used in polishing the substrate for precision parts. For instance, the polishing composition of the embodiment a or the roll-off reducing agent composition is suitable for polishing substrates for precision parts such as substrates for magnetic recording media for magnetic discs, optical discs, opto-magnetic discs, and the like; photomask substrates; glass for liquid crystals; optical lenses; optical mirrors; optical prisms; and semiconductor substrates. The polishing of a semiconductor substrate includes the polishing performed in the steps of polishing a silicon wafer (bare wafer), forming separation film for an embedding element, flattening an interlayer insulating film, forming an embedded metal line, and forming embedded capacitor, and the like. The polishing composition of the embodiment a or the roll-off reducing agent composition of the present invention is especially suitable for polishing a magnetic disc substrate.

5. Process of Reducing Roll-Off of Polished Substrate

In the process of reducing roll-off of the polished substrate with the polishing composition of the embodiment a or the roll-off reducing agent of the present invention, the roll-off of the polished substrate can be remarkably reduced by polishing the substrate to be polished listed above with the polishing composition of the embodiment a or a polishing liquid comprising the roll-off reducing agent of the present invention, or the roll-off reducing agent composition of the present invention per se as a polishing liquid. For instance, a substrate with reduced roll-off can be produced by clamping a substrate with polishing discs to which a polishing cloth made of nonwoven organic polymer fabric is pasted; feeding the polishing composition of the embodiment a of the present invention or a polishing liquid comprising the roll-off reducing agent of the present invention, or the roll-off reducing agent composition of the present invention to a polishing surface; and moving the polishing discs or the substrate, with applying a given pressure.

The roll-off generated in the polished substrate in the present invention can be evaluated by determining the shape of the end surface part by using, for instance, a tracer or optical profilometer, and numerically expressing the extent of how much more the end surface is grounded as compared to the central portion of the disc in accordance with the profile.

Figure 1:
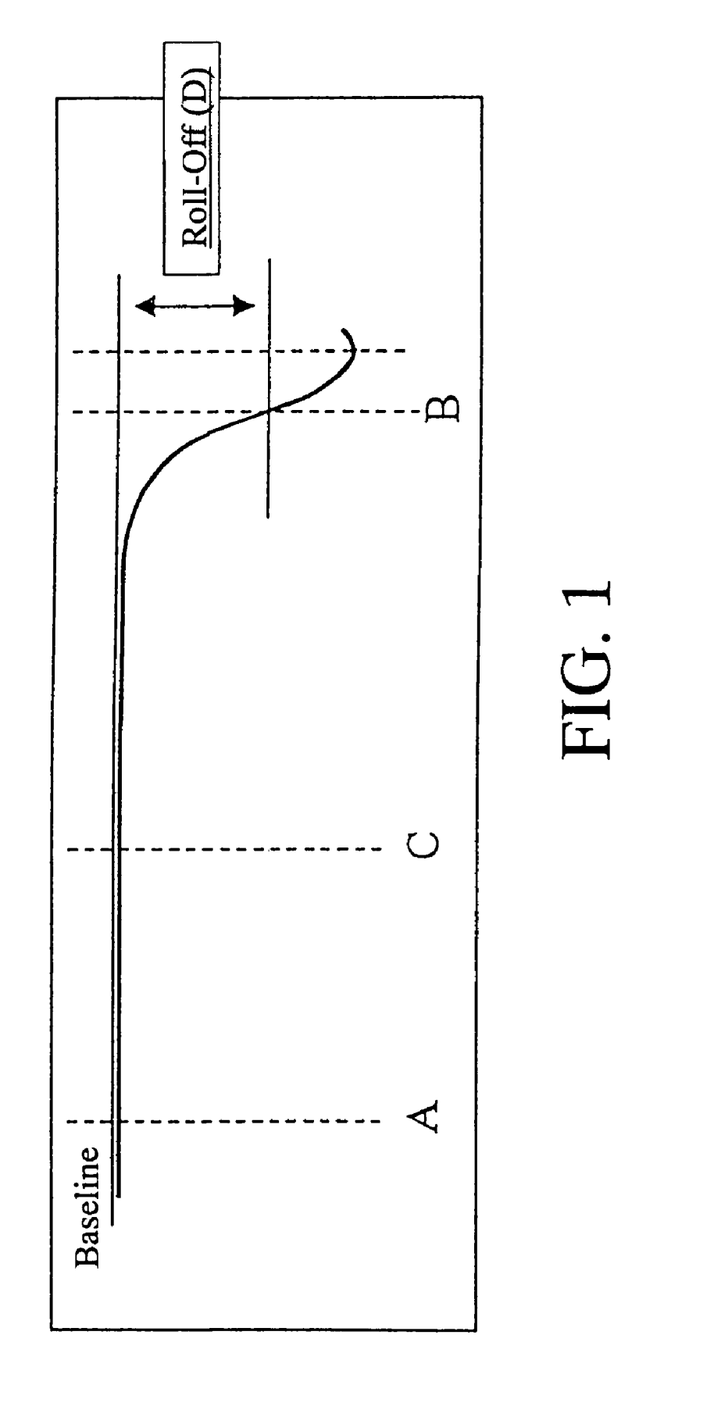
FIG. 1 is a graph showing a roll-off in connection with a detection curve.

The method of numerically expressing roll-off is determined as follows. As shown in FIG. 1, three points, i.e. point A, point B and point C, are taken on the detection curve which are given distances away from the center of the disc, the detection curve meaning the shape of the end surface part of the polished substrate. Roll off refers to a distance (D) between point B and a base line, wherein the base line is defined as a straight line connecting point A and point C. The term "having good roll-off" refers to a value of D more approximating 0. The roll-off value refers to a value obtained by dividing D by ½ of the amount of variation in the thickness of the disc before and after polishing.

The polishing composition of the embodiment a or the roll-off reducing agent composition of the present invention especially has an effect in the polishing process, and the polishing composition of the embodiment a or the roll-off reducing agent composition can be similarly applied to a process other than the polishing process, for instance, a lapping process, and the like.

EXAMPLES

Examples I-1 and I-2 and Comparative Examples
I-1 to I-3

[Method for Formulating Polishing Composition for Polishing]

There were mixed together 20 parts by weight of an abrasive [16 parts by weight of α-alumina (purity: about 99.9%) having primary average particle size: 0.23 μm, and secondary average particle size: 0.65 μm, and 4 parts by weight of intermediate alumina (θ-alumina, average particle size: 0.22 μm, specific surface area: 150 m$^2$/g, purity: about 99.9%)], a given amount of an organic acid (citric acid) used in each Example as listed in Table 1 as other additive, and balance ion-exchanged water, with stirring, to give 100 parts by weight of a polishing composition.

[Determination Method for Surface Potential]

About 20 g of the resulting polishing composition was filtered under reduced pressure for 5 hours with a 0.45 μm pore diameter hydrophilic polytetrafluoroethylene (PTFE) filter, and an abrasive which is the filtration residue was collected. The abrasive was transferred to a 20 mL beaker, and crushed with a glass rod having a diameter of 5 mm until there were no more particles having a size of about 1 mm. The amount 0.1 g of this abrasive and 70 g of water were accurately weighed in a 100 mL beaker, and a 25 mm magnetic stirrer was placed therein. The surface potential was determined, starting at the scale of 550 of a dial labeled "PIST" for controlling the shearing rate of the liquid, and stirring at the scale of 500 by using a particle charge detecting device (commercially available from KYOTO ELECTRONICS MANUFACTURING CO., LTD., Potentiometric Automatic Titrator under the trade name of AT-410, particle charge detector under the trade name of PCD-500, and the potential after 5 minutes was referred to as a specified surface potential A. These Results are Shown in Table 1.

[Polishing Method]

The resulting polishing composition was diluted 3-folds with ion-exchanged water (vol/vol), and a substrate surface made of an Ni—P plated aluminum alloy, the substrate surface having an average deviation, of all points from plane fit to test part surface Ra of 0.2 μm, as determined by Talystep commercially available from Rank Taylor-Hobson Limited (size of tip end of profilometer: 25 μm×25 μm, by-pass filter: 80 μm, measurement length: 0.64 mm), a thickness of 1.27 mm and a diameter of 3.5 inches (diameter of 95.0 mm) was polished with a double-sided processing machine under Set Conditions for Double-Sided Processing Machine given below, to give a polished Ni—P plated, aluminum alloy substrate usable for a substrate for magnetic recording media.

Set Conditions for Double-Sided Processing Machine are as follows.

<Set Conditions for Double-Sided Processing Machine>

Double-sided processing machine: double-sided processing machine, Model 9B, manufactured by SPEEDFAM CO., LTD.

Processing pressure: 9.8 kPa

Polishing Pad: "H9900" (manufactured by FUJI SPINNING Co., Ltd.).

Disc rotational speed: 30 r/min

Feeding flow rate for a diluted polishing composition: 125 ml/min

Polishing time period: 3.5 minutes

Number of substrates introduced: 10

[Polishing Rate]

Weights of each substrate before and after polishing were measured using a device commercially available from Sartorius under the trade name of BP-210S. Change in weight of each substrate was obtained, and an average of 10 substrates is referred to as an amount reduced, and a value obtained by dividing the amount reduced by the polishing time is referred to as a rate of weight reduced. The rate of weight reduced is introduced into the following equation and converted to a polishing rate (μm/min). A relative value (relative polishing rate) of each Example or Comparative Example was calculated based on the polishing rate of the polishing composition in Comparative Example I-3 as a standard value 1. The results are shown in Table 1.

Rate of Weight Reduction (g/min)=[Weight Before Polishing (g)−Weight After Polishing (g)]/Polishing Time (min.)

Polishing Rate (μm/min)=Rate of Weight Reduction (g/min.)/Area of One Side of Substrate (mm$^2$)/Ni—P Plating Density (g/cm$^3$)×10$^6$

[Roll-Off]

The roll-off was determined using a device commercially available from Zygo Corp. under the trade name of Maxim 3D5700 under the following conditions:

Lens: Fizeau×1

Analyzing Software: Zygo Metro Pro (trade name)

Using the device as specified above, the shape of the end part of the disc at 41.5 mm to 47.0 mm away from the center of the disc was determined, and D (the distance from the baseline at point B) was obtained by using the analyzing software in accordance with the above determination method by taking points A, B and C at 41.5 mm away from the center of the disc, at 47 mm away from the center, and at 43 mm away from the center, respectively. The value obtained by dividing D by ½ the amount of change of thickness of the disc before and after polishing was defined as the roll-off value.

The relative polishing rate and the relative roll-off value when the determination value for Comparative Example I-3 was used as a standard value 1 are shown in Table 1. It can be seen from Table 1 that Examples I-1 and I-2 having an amount of citric acid within the range of 0.03 to 0.5% by weight and a surface potential within the range of −140 to 200 mV have reduced roll-off and the same level of polishing rate as that compared to Comparative Example I-3. Also, Comparative Example I-1 having a surface potential larger than 200 mV has a small polishing rate even though the composition has good roll-off.

TABLE 1

| | Organic Acid | | Polishing Rate | Roll-Off | Specified Surface Potential A (mV) |
|---|---|---|---|---|---|
| | Compound | Amount (% by wt.) | (Relative Value) | (Relative Value) | |
| Ex. I-1 | Citric Acid | 0.2 | 0.98 | 0.78 | −8 |
| Ex. I-2 | Citric Acid | 0.5 | 1.00 | 0.95 | −140 |
| Comp. Ex. I-1 | — | — | 0.78 | 0.77 | 338 |
| Comp. Ex. I-2 | Citric Acid | 0.01 | 0.79 | 0.77 | 251 |
| Comp. Ex. I-3 | Citric Acid | 1.0 | 1.00 | 1.00 | −150 |

Examples II-1 to II-6 and Comparative Example I-1

[Determination Method for Surface Potential]

1. Method for Formulating Polishing Composition for Determining Surface Potential Twenty parts by weight of an abrasive (commercially available from Fujimi Incorporated under the trade name of WA#10000) were added to a solution prepared by dissolving 1 part by weight of citric acid in 59 parts by weight of ion-exchanged water, with stirring, and the mixture was stirred for about 30 minutes, to give 80 parts by weight of a polishing composition (a).

A standard polishing composition containing 1% by weight of the roll-off reducing agent was prepared by adding 20 parts by weight of a 5% aqueous solution of the roll-off reducing agent to 80 parts by weight of the polishing composition (a) with sufficient stirring, and stirring the mixture for about 30 minutes. Also, a standard polishing composition not containing the roll-off reducing agent used as a comparative example was prepared by adding 20 parts by weight of ion-exchanged water to 80 parts by weight of the polishing composition (a) with sufficient stirring, and stirring the mixture for about 30 minutes.

2. Determination Method for Surface Potential

About 20 g of the standard polishing composition (Examples II-1 to II-6) or the standard polishing composition not containing a roll-off reducing agent (Comparative Example II-1) was filtered under reduced pressure for 5 hours with a 0.45 μm pore diameter hydrophilic PTFE filter, and an abrasive which is the filtration residue was collected. The collected abrasive was transferred to a 20 mL beaker, and crushed with a glass rod having a diameter of 5 mm until there were no more particles having a size of about 1 mm. The amount 0.1 g of this abrasive and 70 g of water were accurately weighed in a 100 mL beaker, and a 25 mm magnetic stirrer was placed therein. The surface potential was determined, starting at the scale of 550 of a dial labeled "PIST" for controlling the shearing rate of the liquid, and stirring at the scale of 500 by using a particle charge detecting device (commercially available from KYOTO ELECTRONICS MANUFACTURING CO., LTD., Potentiometric Automatic Titrator under the trade name of AT-410, particle charge detector under the trade name of PCD-500, and the potential after 5 minutes was referred to as a specified surface potential B. These results are shown in Table 2.

TABLE 2

|  | Roll-Off Reducing Agent | | Specified Surface Potential B (mV) |
|---|---|---|---|
|  | Compound | Amount (% by wt.) | |
| Ex. II-1 | Ammonium Sulfate | 1.0 | −70 |
| Ex. II-2 | Potassium Sulfate | 1.0 | −32 |
| Ex. II-3 | Sodium Sulfate | 1.0 | −31 |
| Ex. II-4 | Nickel Sulfate | 1.0 | 12 |
| Ex. II-5 | Aluminum Sulfate | 1.0 | 171 |
| Ex. II-6 | Ammonium Chloride | 1.0 | −31 |
| Comp. Ex. II-1 | — | — | −123 |

It can be seen from the results shown in Table 2 that all of the standard polishing compositions of Examples II-1 to II-6 containing the roll-off reducing agent of the present invention have their specified surface potentials B controlled to −110 to 250 mV in contrast to a specified surface potential B of −123 mV of Comparative Example II-1.

Examples II-7 to II-15 and Comparative Examples II-2 to II-4

[Method for Formulating Polishing Composition for Polishing]

There were mixed together 16 parts by weight of α-alumina (purity: about 99.9%) having primary average particle size of 0.23 μm, and secondary average particle size of 0.65 μm, and 4 parts by weight of θ-alumina (average particle size: 0.22 μm, specific surface area: 150 m$^2$/g, purity: about 99.9%), given amounts of the roll-off reducing agent, the compounds (A) and the compounds (B) as listed in Tables 3 to 4 as other additives, and balance ion-exchanged water, with stirring, to give 100 parts by weight of a polishing composition.

[Polishing Method]

The resulting polishing composition was diluted 3-folds with ion-exchanged water (vol/vol), and a substrate surface made of an Ni—P plated aluminum alloy, the substrate surface having an average deviation, of all points from plane fit to test part surface Ra of 0.2 μm, as determined by Talystep commercially available from Rank Taylor-Hobson Limited (size of tip end of profilometer: 25 μm×25 μm, by-pass filter: 80 μm, measurement length: 0.64 mm), a thickness of 1.27 mm and a diameter of 3.5 inches (diameter of 95.0 mm) was polished with a double-sided processing machine under Set Conditions for Double-Sided Processing Machine given below, to give a polished Ni—P plated, aluminum alloy substrate usable for a substrate for magnetic recording media.

Set Conditions for Double-Sided Processing Machine are as follows.

<Set Conditions for Double-Sided Processing Machine>

Double-sided processing machine: double-sided processing machine, Model 9B, manufactured by SPEEDFAM CO., LTD.

Processing pressure: 9.8 kPa

Polishing Pad: "H9900" (manufactured by FUJI SPINNING Co., Ltd.).

Disc rotational speed: 30 r/min

Feeding flow rate for a diluted polishing composition: 125 ml/min

Polishing time period: 3.5 minutes

Number of substrates introduced: 10

[Polishing Rate]

Weights of each substrate before and after polishing were measured using a device commercially available from Sartorius under the trade name of BP-210S. Change in weight of each substrate was obtained, and an average of 10 substrates is referred to as an amount reduced, and a value obtained by dividing the amount reduced by the polishing time is referred to as a rate of weight reduced. The rate of weight reduced was introduced into the following equation and converted to a polishing rate (μm/min). A relative value (relative polishing rate) of each of Example II-7 to II-13 was calculated based on the polishing rate of the polishing composition in Comparative Example II-2 as a standard value 1, and a relative value (relative polishing rate) of Example II -14, II-15 or Comparative Example II-4 was calculated based on the polishing rate of the polishing composition in Comparative Example II-3 as a standard value 1.

$$\text{Rate of Weight Reduction (g/min)} = [\text{Weight Before Polishing (g)} - \text{Weight After Polishing (g)}]/\text{Polishing Time (min.)}$$

$$\text{Polishing Rate (μm/min)} = \text{Rate of Weight Reduction (g/min.)}/\text{Area of One Side of Substrate (mm}^2\text{)}/\text{Ni—P Plating Density (g/cm}^3\text{)} \times 10^6$$

[Roll-Off]

The roll-off was determined using a device commercially available from Zygo Corp. under the trade name of Maxim 3D5700 under the following conditions:

Lens: Fizeau×10

Analyzing Software: Zygo Metro Pro (trade name)

Using the device as specified above, the shape of the end part of the disc at 41.5 mm to 47.0 mm away from the center of the disc was determined, and D (the distance from the baseline at point B) was obtained by using an analyzing software in accordance with the above determination method by taking points A, B and C at 41.5 mm away from the center of the disc, at 47 mm away from the center, and at 43 mm away from the center, respectively. The value obtained by dividing D by ½ the amount of change of thickness of the disc before and after polishing was defined as the roll-off value.

The relative polishing rate and the relative roll-off value when the determination values for Comparative Example II-2 were used as standard value 1 are shown in Table 3 and when the determination values for Comparative Example II-3 were used as standard value 1 are shown in Table 4.

TABLE 3

| | Roll-Off Reducing Agent | | Compounds (A) | | Polishing Rate | Roll Off |
|---|---|---|---|---|---|---|
| | Compound | Amount (Parts by wt.) | Compound | Amount (Parts by wt.) | (Relative Value) | (Relative Value) |
| Ex. II-7 | Ammonium Sulfate | 0.5 | Citric Acid | 1.0 | 1.09 | 0.73 |
| Ex. II-8 | Potassium Sulfate | 0.5 | Citric Acid | 1.0 | 1.09 | 0.80 |
| Ex. II-9 | Sodium Sulfate | 0.5 | Citric Acid | 1.0 | 1.08 | 0.92 |
| Ex. II-10 | Nickel Sulfate | 0.5 | Citric Acid | 1.0 | 1.04 | 0.95 |
| Ex. II-11 | Aluminum Sulfate | 0.5 | Citric Acid | 1.0 | 1.07 | 0.73 |
| Ex. II-12 | Ammonium Sulfate | 2.0 | Citric Acid | 1.0 | 1.10 | 0.75 |
| Ex. II-13 | Ammonium Chloride | 0.5 | Citric Acid | 1.0 | 0.94 | 0.78 |
| Comp. Ex. II-2 | — | — | Citric Acid | 1.0 | 1.00 | 1.00 |

TABLE 4

| | Roll-Off Reducing Agent | | Compounds (A) | | Compounds (B) | | | Polishing Rate | Roll Off |
|---|---|---|---|---|---|---|---|---|---|
| | Compound | Amount (Parts by wt.) | Compound | Amount (Parts by wt.) | Compound | Amount (Parts by wt.) | Compound | Amount (Parts by wt.) | (Relative Value) | (Relative Value) |
| Ex. II-14 | Ammonium Sulfate | 0.5 | Citric Acid | 1.0 | — | — | Itaconic Acid | 0.5 | 1.05 | 0.81 |
| Ex. II-15 | Ammonium Sulfate | 0.5 | Citric Acid | 0.5 | Oxalic Acid | 0.5 | Itaconic Acid | 0.5 | 1.04 | 0.79 |
| Comp. Ex. II-3 | — | — | Citric Acid | 1.0 | — | — | Itaconic Acid | 0.5 | 1.00 | 1.00 |
| Comp. Ex. II-4 | — | — | Citric Acid | 0.5 | Oxalic Acid | 0.5 | Itaconic Acid | 0.5 | 0.98 | 0.99 |

It can be seen from the results of Tables 3 and 4 that since the roll-off reducing agent of the present invention is contained in the polishing composition (Examples II-7 to II-15), the roll-off can be reduced without lowering the polishing rate, as compared to a case where the roll-off reducing agent is not contained (Comparative Examples II-2 to II-4).

It can be seen from the comparison of Example II-14 with Comparative Example II-3 that since the roll-off reducing agent of the present invention having controlled surface potential is contained in the polishing composition, even when several organic acids are mixed, the roll-off can be reduced without lowering the polishing rate.

Since the roll-off reducing agent, the roll-off reducing agent composition comprising the roll-off reducing agent or the polishing composition of the present invention is used for polishing a substrate for precision parts, there is exhibited an effect that the roll-off of the substrate is dramatically reduced.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polishing composition comprising:
a roll-off reducing agent comprising an inorganic compound having a property of controlling a surface potential of an abrasive in a polishing composition, wherein a surface potential of the abrasive in a standard polishing composition is controlled to −110 to 250 mV by the presence of the inorganic compound, wherein the standard polishing composition is prepared which comprises 20 parts by weight of an abrasive, said abrasive being a high-purity alumina having an $Al_2O_3$ purity of 98.0% or more, and wherein the $Al_2O_3$ is composed of an α-type corundum crystal, 1 part by weight of citric acid, 78 parts by weight of water and 1 part by weight of an inorganic compound, and wherein
the inorganic compound is at least one compound selected from the group consisting of a sulfur-containing inorganic acid or a salt thereof, a phosphorus-containing inorganic acid or a salt thereof, a halogen-containing inorganic acid or a salt thereof, a carbonate, a cyanate, and a metal atom-containing inorganic acid or a salt thereof.

2. The polishing composition according to claim 1, further comprising an abrasive, an organic acid or a salt thereof, and water.

3. The polishing composition according to claim 2, wherein the abrasive is alumina.

4. The polishing composition according to claim 2, wherein the organic acid or the salt thereof is at least one compound selected from the group consisting of a monocarboxylic acid and polycarboxylic acid having either OH group or groups or SH group or groups, a dicarboxylic acid having 2 to 3 carbon atoms and having neither OH group or groups nor SH group or groups, a monocarboxylic acid having neither OH group or groups nor SH group or groups and a salt thereof.

5. The polishing composition according to claim 4, wherein the organic acid is at least one compound selected from the group consisting of glycolic acid, mercaptosuccinic acid, thioglycolic acid, lactic acid, β-hydroxypropionic acid, malic acid, tartaric acid, citric acid, isocitric acid, allocitric acid, gluconic acid, glyoxylic acid, glyceric acid, mandelic acid, tropic acid, benzilic acid, salicylic acid, formic acid, acetic acid, propionic acid, butyric acid, isobutyric acid, valeric acid, isovaleric acid, hexanoic acid, heptanoic acid, 2-methylhexanoic acid, octanoic acid, 2-ethylhexanoic acid, nonanoic acid, decanoic acid and lauric acid.

* * * * *